US012703042B2

(12) United States Patent
Arndt Dr habil

(10) Patent No.: US 12,703,042 B2
(45) Date of Patent: Aug. 11, 2026

(54) METHOD AND APPARATUS FOR CHECKING A CONNECTION DURING A LASER-BASED CONNECTING METHOD

(71) Applicant: Ford Global Technologies, LLC, Dearborn, MI (US)

(72) Inventor: Christoph Arndt Dr habil, Moerlen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1084 days.

(21) Appl. No.: 17/849,183

(22) Filed: Jun. 24, 2022

(65) Prior Publication Data

US 2022/0410308 A1 Dec. 29, 2022

(30) Foreign Application Priority Data

Jun. 25, 2021 (DE) ........................ 102021116495.8

(51) Int. Cl.

*B23K 31/12* (2006.01)
*B23K 26/03* (2006.01)
*G01B 11/30* (2006.01)

(52) U.S. Cl.

CPC .......... *B23K 26/032* (2013.01); *G01B 11/303* (2013.01)

(58) Field of Classification Search

CPC .... B23K 26/032; B23K 1/0056; B23K 26/21; B23K 31/125; G01B 11/303; G01B 5/0037; G01B 11/24; G06T 7/0004; G06T 5/90; G06T 7/11; G06T 7/90; G06T 2207/30136

See application file for complete search history.

(56) References Cited

U.S. PATENT DOCUMENTS 6,757,055 B1 * 6/2004 Kluft .................... B23K 26/032 356/73
2002/0159643 A1 * 10/2002 DeYong ............ H05K 13/0815 382/170
2003/0053677 A1 3/2003 Deyong et al.

FOREIGN PATENT DOCUMENTS

DE 10335501 2/2004
DE 10335501 A1 * 2/2004 ........... B23K 26/043
DE 60216623 9/2007
DE 102014107716 6/2015
EP 1099506 5/2001
JP H03118975 5/1991

OTHER PUBLICATIONS

Search Report issued in corresponding DE Application No. 102021116495.8, issued Mar. 11, 2022, 8 pages.

* cited by examiner

*Primary Examiner* — Tiffany T Tran
(74) *Attorney, Agent, or Firm* — Burris Law, PLLC

(57) ABSTRACT

A method for checking a connection region formed during a joining process of at least two metal components via a laser. The method includes producing a photographic recording of the connection region being formed, transforming the photographic recording, creating at least two image strips in the photographic recording, and assessing the at least two image strips. An apparatus for carrying out the method is further provided.

19 Claims, 10 Drawing Sheets

METHOD AND APPARATUS FOR CHECKING A CONNECTION DURING A LASER-BASED CONNECTING METHOD

CROSS-REFERENCE TO RELATED APPLICATION

This application claims priority to and the benefit of German Patent Application No. 102021116495.8, filed on Jun. 25, 2021. The disclosure of the above application is incorporated herein by reference.

FIELD

The present disclosure relates to a method for checking the surface quality of a connecting region between two metal components connected by means of a laser and to an apparatus for carrying out the method.

BACKGROUND

The statements in this section merely provide background information related to the present disclosure and may not constitute prior art.

In conventional production methods in the automobile sector, known joining methods such as laser-beam hard soldering and laser-beam welding are used. Laser-beam hard soldering is often used to join galvanized steel sheets or lightweight components made of aluminum. In this case, a laser beam is guided along the joining location while melting an auxiliary material, for example a copper-silicon wire, which upon cooling connects together the components to be joined. By means of laser-beam hard soldering, it is possible to provide connections which have a high strength comparable to a welding seam as well as a high surface quality.

In laser-beam welding, a laser beam is used as an energy supply. A concentrated energy input in the region of the components to be joined together causes little thermal distortion, for which reason the method is suitable for joining together components in the automobile industry. In this case, metal components are generally joined together without auxiliary material.

Connections produced by laser-beam hard soldering and laser-beam welding hardly need to be retreated because the connecting region is smooth enough for a subsequent processing step, for example in order to apply a coating. Ideally, said connections are so smooth that they cannot be perceived visually by a customer. Irregularities in the surface may however occur in the joining process, for example due to holes in the connecting region or splashed material in neighboring regions. Such irregularities are disadvantageous since they not only cause an uneven surface but may also lead to insufficient strength of the joint. In the course of the service life of the corresponding vehicle, this may under unfavorable circumstances lead to breaking of the connection.

Quality control of said joints is therefore desired. Conventionally, this is carried out by means of optical systems which are used to monitor the production process and to appraise the surface quality. The detection rate of such systems should, however, be high enough to avoid frequent stopping of the joining method.

These issues and other related to checking a connection produced by laser-beam hard soldering and laser-beam welding are addressed by the present disclosure.

SUMMARY

This section provides a general summary of the disclosure and is not a comprehensive disclosure of its full scope or all of its features.

A first aspect of the present disclosure relates to a method for checking a region of a connection produced by means of a laser between at least two metal components, having the steps: joining the components together by using a laser; providing a photographic recording which has been produced during the production of the connection between the components; transforming the recording; creating at least two image strips in the recording, which are arranged vertically with respect to the longitudinal orientation of the connecting region; and assessing the image strips.

The method according to the present disclosure comprises a plurality of sub-algorithms. In this case, we discovered that problems of image processing, such as fluctuating signals, varying brightness conditions, impairment of optical parts of the laser device during the method, etc., may be overcome by tuning and automatic adaptation of the sub-algorithms. In this case, the surface of the connecting region is appraised directly during the production of the connection. In this way, it is already possible to register during the production of the connection whether irregularities emerge in the surface, and the relevant location is directly processed again with the laser. The assessment of strip regions in this case reduces the computerized calculation outlay significantly.

In the next step, the recording is transformed. In this case, as an image-processing measure, the recording provided is assigned a result image by transformation of the gray values of the pixels of the recording. In one form, the recording is transformed into brightness regions in the method according to the invention. In this case, each pixel is assigned its own brightness value. Likewise, in one form, in addition or as an alternative to the brightness transformation, the recording is transformed into color regions. In this case, each pixel is assigned its own color value.

The image strips in the recording, which are arranged vertically with respect to the longitudinal orientation of the connecting region, are in other words arranged perpendicularly, that is to say at an angle of 90°, with respect to the extent direction of the joint produced. In one form, the shape, number and position of the image strips may be freely selected. At least two image strips, but in one form a plurality of image strips, are arranged in the recording.

The term metal components refers to the fact that the material of the components to be joined together comprises at least one metal. The metallic material may in one form be an alloy or specifically a metal, in one form aluminum, which is used in the automobile industry for the manufacture of lightweight components.

In one form at least two image strips are arranged overlapping, that is to say they overlap to a certain extent. Overlapping image strips have the advantage that regions are analyzed several times. This provides a certain redundancy, which is advantageous because it increases the probability of the detection of registered anomalies, that is to say it reports fewer false-positive values in comparison with conventional methods. For each image strip, the registered region of the connecting region may be assessed. If an image strip is wider than a pixel, a line is assigned to each pixel width. Each line is then analyzed individually. The results of the line are then combined in order to give a result of the image strip. The result of the image strip in this case corresponds to an average value of the individual lines.

In one form, each image strip is divided into at least a first, a second and a third strip region, the first strip region being assigned to the first metal region, the second strip region being assigned to the connecting region and the third strip region being assigned to the second metal component. In one form, the transformed values of the first and second strip regions are used to create a baseline in a height diagram of the image strip. In other words, the brightness regions of the surfaces of the metallic material of the components joined together are used in order to provide a normalization for each image strip or each pixel line. The brightness varying from the outer regions of the components to the connecting region is advantageously also taken into account during the normalization of the image strip.

Since the image data are dynamic and nonergodic, differences in the brightness, which are attributable to differences in the surfaces of the material of the components and to different brightnesses that exist during the joining method, are eliminated by the normalization. With the normalization, all the various image strips, which may have different shapes, that is to say different widths, may therefore advantageously be compared with one another.

In one form, the height line of the second strip region is used in relation to the baseline in order to appraise anomalies during the production of the connection. The differences obtained correspond to the height of the surface of the connecting region in comparison with the height of the surfaces of the components. The image edges, which correspond to a transition region from a component to the connecting region, may in this case likewise be registered. If the height of the graph falls below the baseline, it is decided that there is a hole at this location. In this case, a certain depth is tolerated; in one form, a distance from the baseline beyond which a hole is appraised as such (decision depth or height) may be specified. The size of the hole may be determined with the aid of the number of pixels which lie below the decision line. The extent perpendicularly to the baseline may be determined by different strips with a different width. In this way, the extent and the depth of a hole in the connecting region may be determined; if the size of the hole exceeds a tolerance range, a corresponding signal may be output.

Advantageously, not only may the surface height be monitored with the method, but also the width of the connecting region, the material height and depth in the transition region from a component to the connecting region (and the borders of the transition region, seam edges) may be tracked.

In one form, in the method, a height graph is created for each image strip and the height graphs of all the image strips are combined to form a three-dimensional surface map. The connecting region may therefore advantageously be represented and appraised as a whole.

In one form, in the method, the image strips are interpolated in the sub-pixel range. This way, the efficiency of the method for discovering actual anomalies may advantageously be improved.

A second aspect of the present disclosure relates to an apparatus for carrying out the method according to the invention, which comprises at least one control device that is configured to control the steps of the method and to register anomalies in the region of a connection between two metal components which is produced by using a laser.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
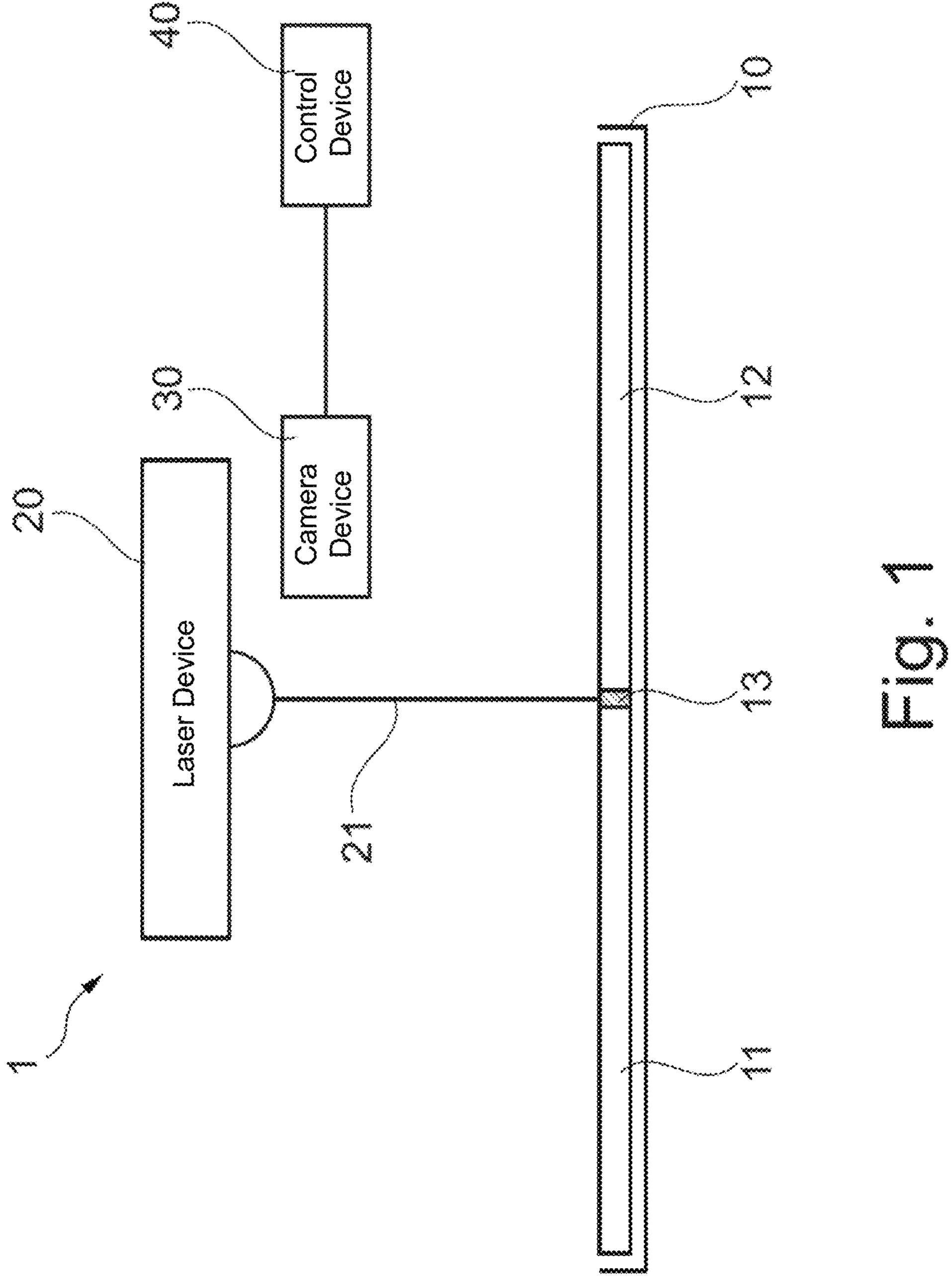
FIG. 1 shows a form of an apparatus, according to the teaching of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A form of an apparatus 1 according to the present disclosure comprises, according to the representation of FIG. 1, a holding device 10 in which a first component 11 and a second component 12 are arranged with one another. The apparatus 1 comprises a laser device 20 which is configured for laser-beam hard soldering. The apparatus 1 in this case comprises further devices (not shown) to provide auxiliary materials desired for soldering methods, in one form a solder in the form of a solder wire which is melted by means of a laser beam 21 emitted by the laser device 20 and is used to join the components. As an alternative, the apparatus 1 may also be configured for laser-beam welding.

The apparatus 1 furthermore comprises a camera device 30. The camera device 30 is configured to provide image recordings of the surface of the components while they are being joined together. The camera device 30 is configured as a coaxial camera and has a laser illumination device, the wavelength of the laser of the laser illumination device differing from the wavelength of the processing laser of the laser soldering device. The camera device 30 is arranged in FIG. 1 in such a way that images of the connection produced between the components can be recorded directly behind the laser beam 21. As an alternative, the camera device may be arranged in such a way that images can be recorded through the processing beam.

The apparatus furthermore comprises a control device 40. The control device 40 is configured to control the steps of a method carried out with the apparatus 1 and to register anomalies in the region of a connection produced by using the laser 21 between two metal components. The control device 40 has an active signal-technology connection to the camera device 30.

Figure 2:
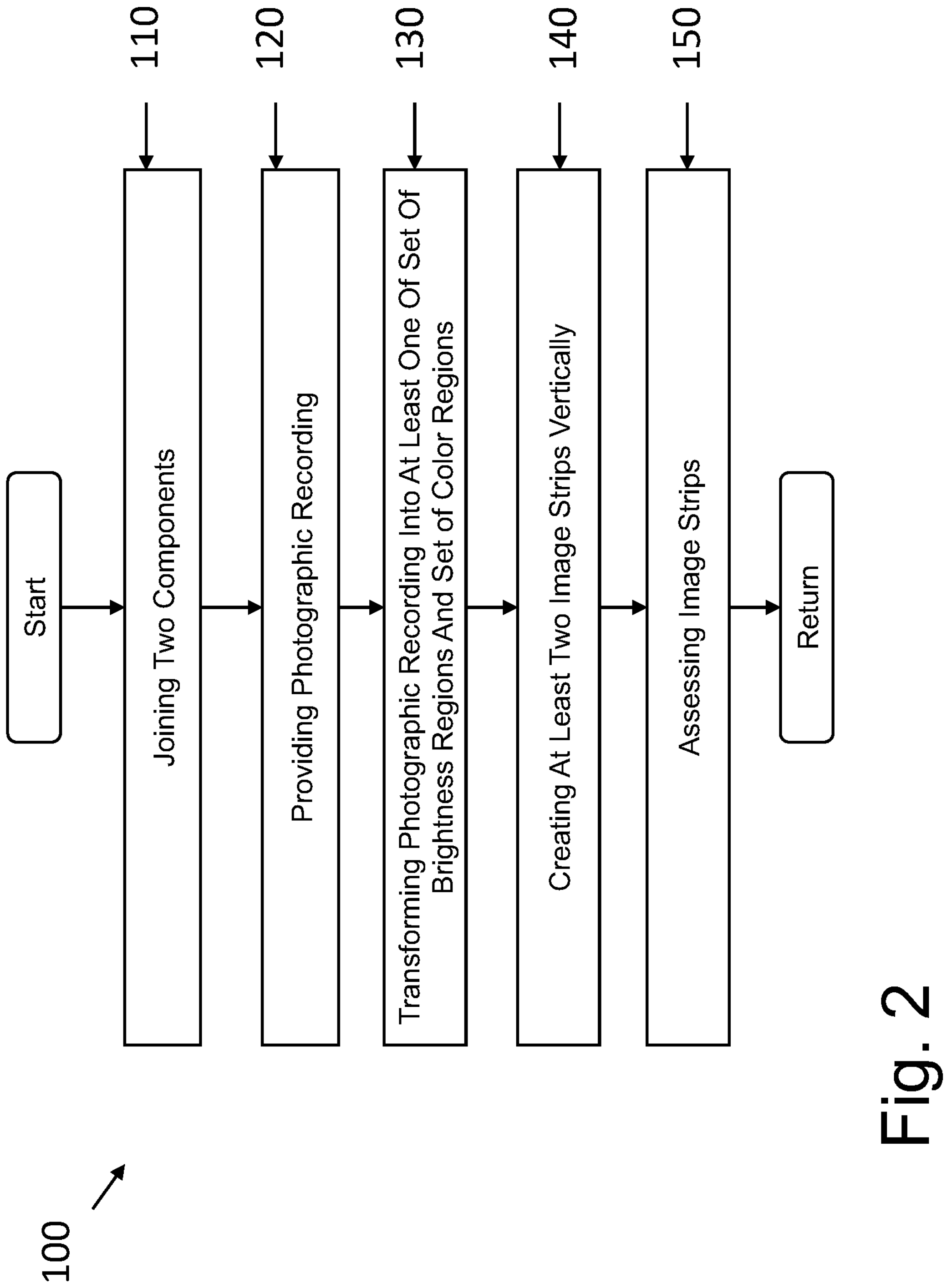
FIG. 2 shows a flowchart of a form of the method, according to the teachings of the present disclosure.

In one form, a method 100 according to the present disclosure is provided in the flowchart of FIG. 2 for checking a region of a connection 13 produced by means of a laser between at least two metal components. At 110, the components 11 and 12 are connected by laser-beam hard soldering. To this end the first component 11, an aluminum-silicon hard solder, and the second component 12 are arranged in the apparatus 1 with a material fit to one another. By the effect of the laser, the hard solder is melted. By the hard solder re-solidifying, the first component 11 and the second component 12 are connected to one another. The connecting region 13 is not represented over the length of the components 11 and 12 in FIGS. 3, 4 and 9 because it is still in the process of being produced. The production of the connection in this case takes place (as seen in the figures) from right to left.

Figure 3:
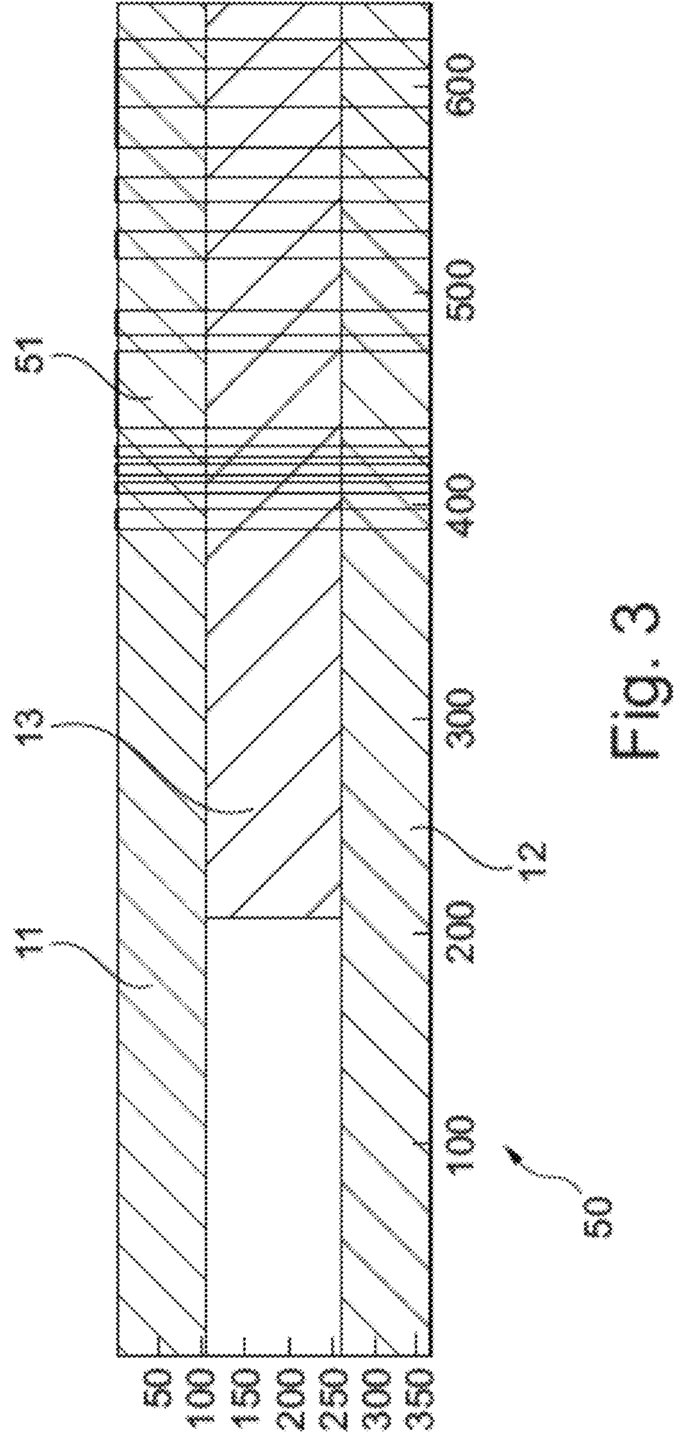
FIG. 3 shows a representation of the creation of image strips of a recording, according to the teachings of the present disclosure.

At 120, a photographic recording 50, which has been recorded by the camera device 30 during the production of the connection between the components 11, 12, is provided. In this case, during the chronological course of the joining method, images of the connecting region 13 of the solder connection that has just solidified are recorded, so that the surface quality is already checked continuously during the soldering process (FIG. 3). The images may be recorded as individual images or recorded in the form of a video, an image sequence of a plurality of individual images being recorded.

The image segment is selected by the camera device 30 in such a way that it respectively records a part of the surface of the first component 11 and of the second component 12 as well as the connecting region 13 lying between the components. The images are transmitted by the camera device 30 to the control device 40.

In the control device 40, which is configured to process images, the recording is transformed at 130. In this case, the recording is transformed on the one hand into brightness regions (i.e., one or more brightness regions). In this case, each pixel is assigned its own brightness value. Furthermore, the recording is transformed into color regions (i.e., one or more color regions). In this case, each pixel is assigned its own color value. Only one transformation may also respectively be carried out. The recording may also be transformed by further methods familiar to the person skilled in the art.

At 140, a number of image strips 51 arranged vertically with respect to the longitudinal orientation of the connecting region are created in the recording. In FIG. 3, 11 image strips 51 are arranged. The image strips 51 have different widths. The image strips 51 furthermore have different distances from one another. Furthermore, some of the image strips 51 overlap with one another, as may be seen in the right-hand image side in FIG. 3.

Figure 4:
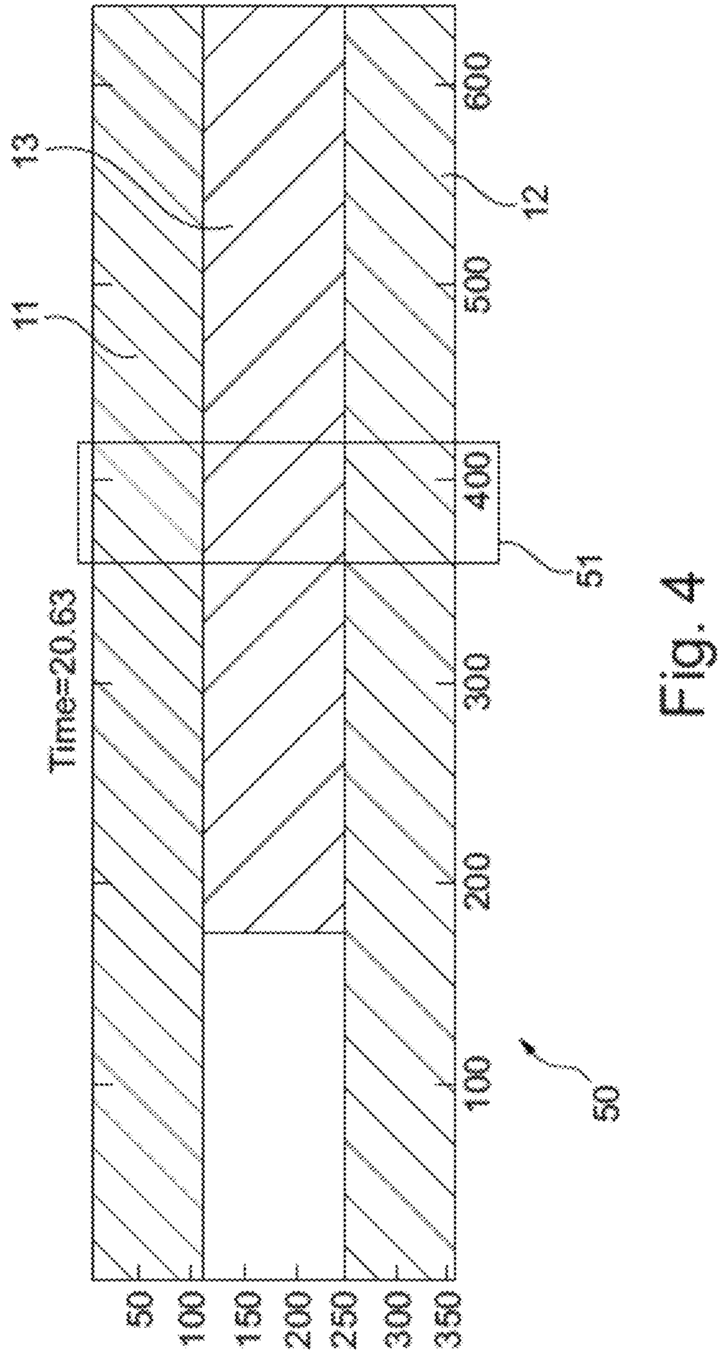
FIG. 4 shows a representation of the division of an image strip according to FIG. 3, according to the teachings of the present disclosure.
Figure 6:
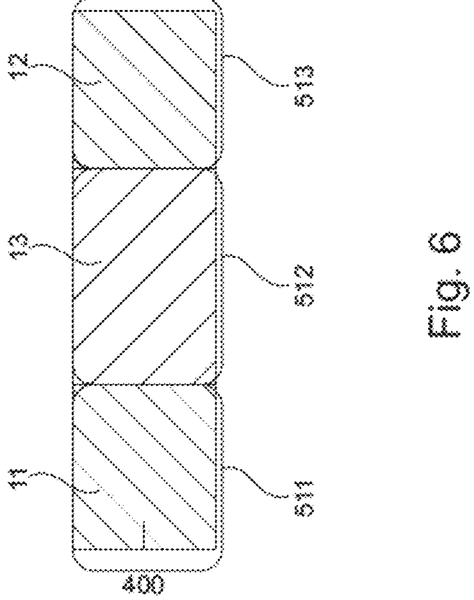
FIG. 6 shows a representation of a division of an image strip, according to the teachings of the present disclosure.
Figure 5:
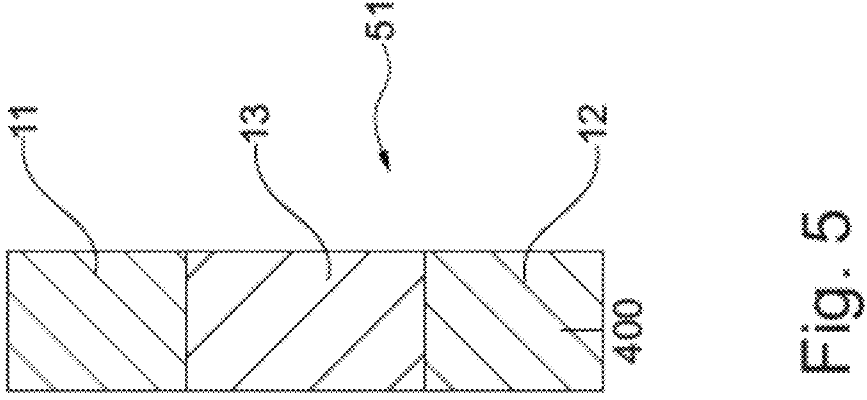
FIG. 5 shows a representation of an image strip, according to the teachings of the present disclosure.

At 150, the image strips 51 are assessed. To this end, the image strips are respectively subdivided into three strip regions. In one form, the image strip 51 in FIG. 4 is analyzed as a single image from the recording 50, as represented in FIG. 5. According to the representation of FIG. 6, the image strip 51 is divided into a first strip region 511, which relates to the surface of the first component 11, a second strip region 512, which relates to the surface of the connecting region 13, and a third strip region 513, which relates to the surface of the second component 12.

Figure 7:
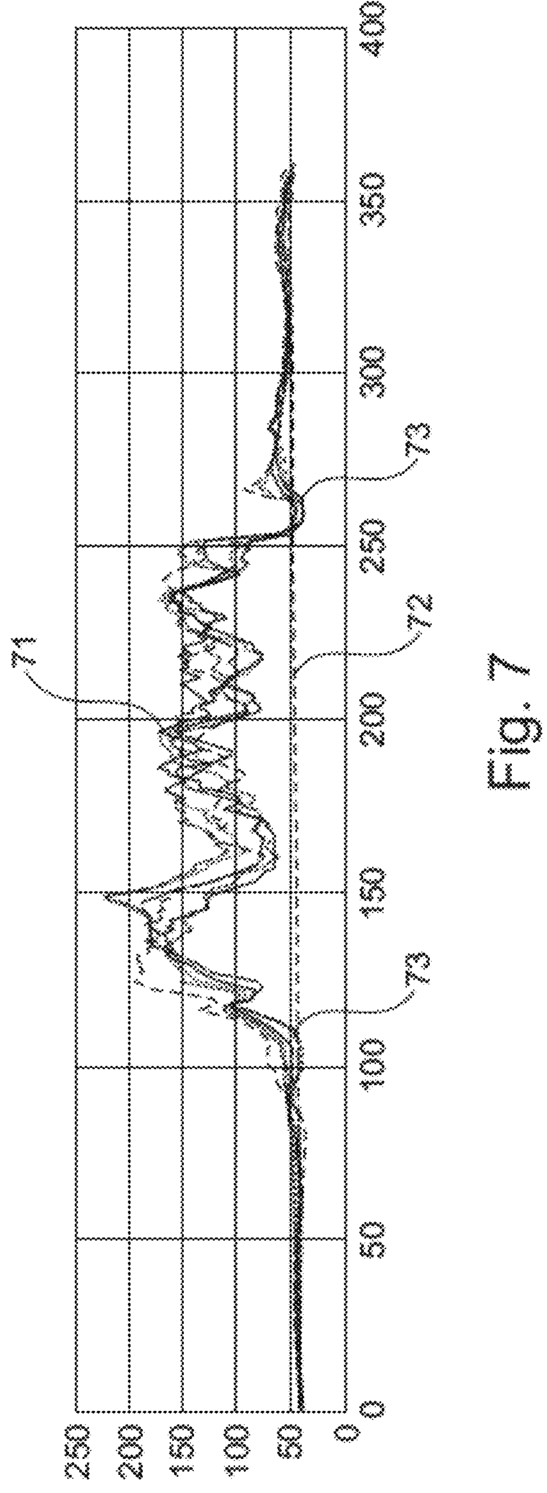
FIG. 7 shows a representation of a height diagram created on the basis of pixel data, according to the teachings of the present disclosure.

The metal surfaces of the first and second components 11, 12, and therefore the strip regions 511 and 513, are in this case used to normalize the brightness values in the image strip 51, or else each pixel line in the image strip 51. In this case, a normalized line which serves as a reference for a smooth surface with a normal height profile is provided. The brightness values in each of the strip regions 511, 513 are used as a basis for calculation of an average value. If the brightness values of the pixel lines within the image strip 51 are used, average values for the strip regions 511, 513 are formed on the basis of these. Brightness values varying from the outer borders of the strip regions 511, 513 to the inner borders, where they join the strip region 512, may also be used to calculate a normalized reference line. A height profile, based on brightness values, of the image strip 51 is represented in FIG. 7. In the diagram of FIG. 7 the width profile of the joint produced is plotted on the x axis from the first component 11 through the connecting region 13 to the second component 12. The y axis corresponds to the height value of the corresponding surfaces in μm. Height lines 71 in this case range from a height profile assigned to the strip region 511 through one assigned to the strip region 512 to one assigned to the strip region 513. A normalized height line 72 in this case extends from the strip region 511 to the strip region 513, while extending significantly below the height profile of the strip region 512. At the locations 73 which correspond to the boundary regions of the connecting region 13, where the connecting region 13 adjoins the components 11, 12, the height line profile indicates the transition between the connecting region 13 and the first component 11 or second strip region 512 to one assigned to the strip region 513. A normalized component 12, respectively. The height lines for the connecting region 13 show that the connecting region 13 is raised above the surface of the components 11, 12.

The method in this case makes it possible not only to establish the height profile in image strip 51 but also to register the width of the connecting region 13, the depth of the boundary regions of the connecting region 13. Tracking of the boundary regions may also be carried out as a separate process, in which an entire image recorded from the connecting region 13 is assessed, in order to appraise the quality of the boundary regions.

Figure 8:
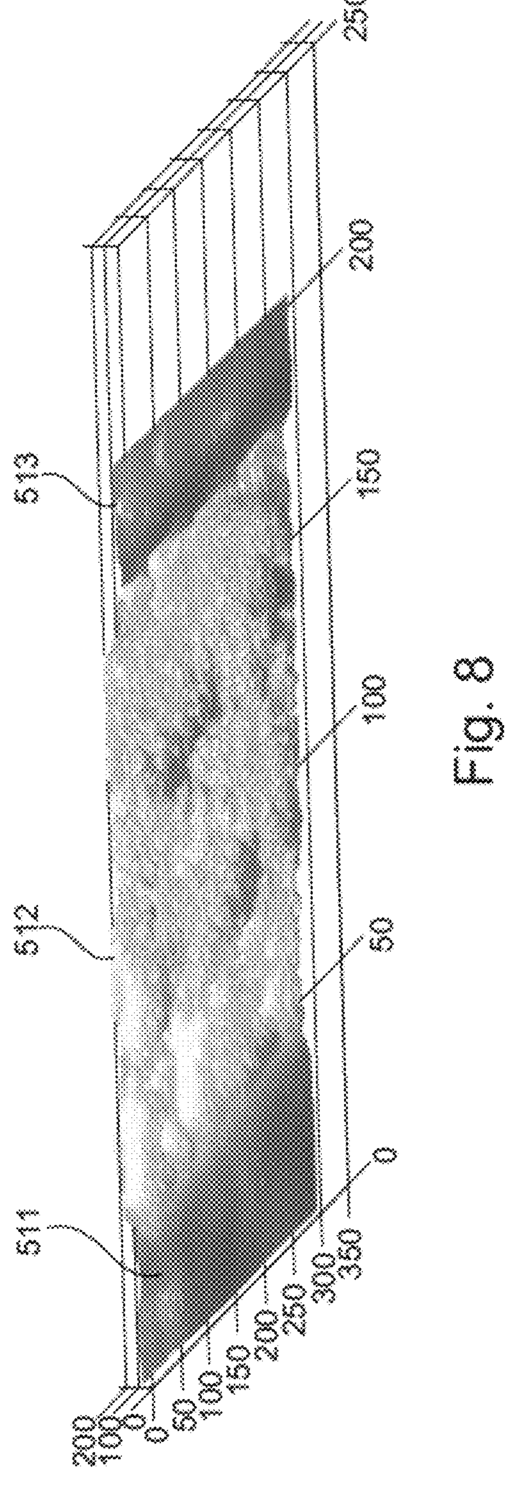
FIG. 8 shows a representation of a three-dimensional height diagram created on the basis of pixel data, according to the teachings of the present disclosure.

For each strip 51, a height line created as in FIG. 7 or a created height profile (in the case of a plurality of pixel lines) is created in a three-dimensional surface map according to FIG. 8. By combination with three-dimensional surface maps, provided according to the method, of further image strips, it is possible to generate a map of an entire connecting region 13, as shown in FIG. 8. In this case, the various brightnesses over the connecting region 13 may be seen clearly, the brighter regions in the connecting region 13 being clearly distinguishable from the dark regions, which correspond to the surfaces of the first and second component 11, 12.

Figure 9:
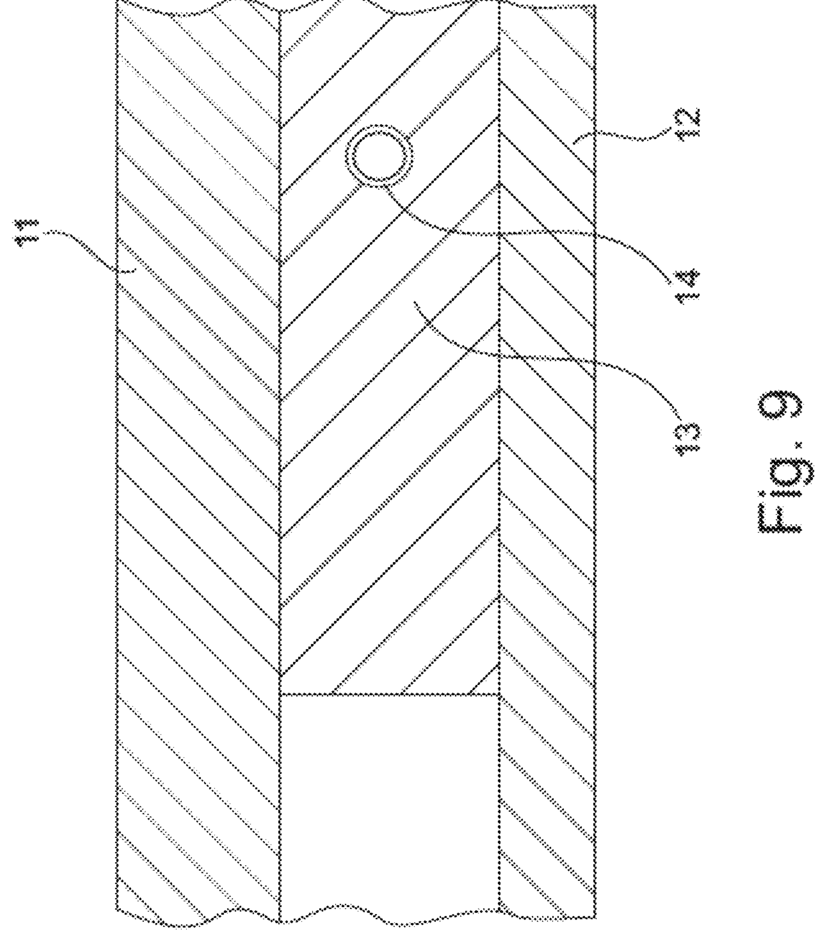
FIG. 9 shows a representation of a connecting region between two components joined together, with a hole registered according to the teachings of the present disclosure.
Figure 11:
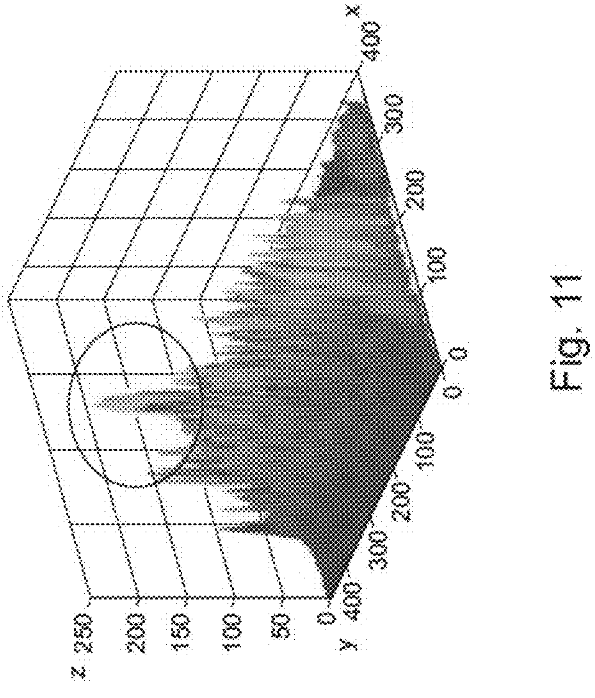
FIG. 11 shows a three-dimensional height diagram of another image strip created for the connecting region represented in FIG. 8, according to the teachings of the present disclosure.
Figure 10:
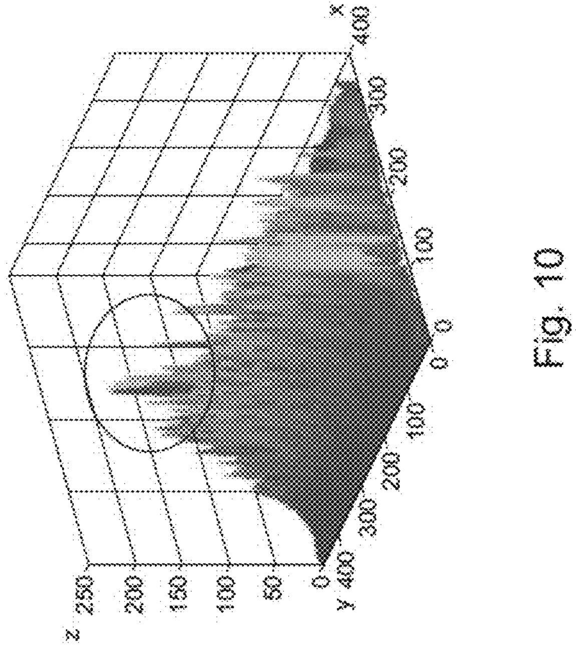
FIG. 10 shows a three-dimensional height diagram of an image strip created for the connecting region represented in FIG. 8, according to the teachings of the present disclosure.
Figure 12:
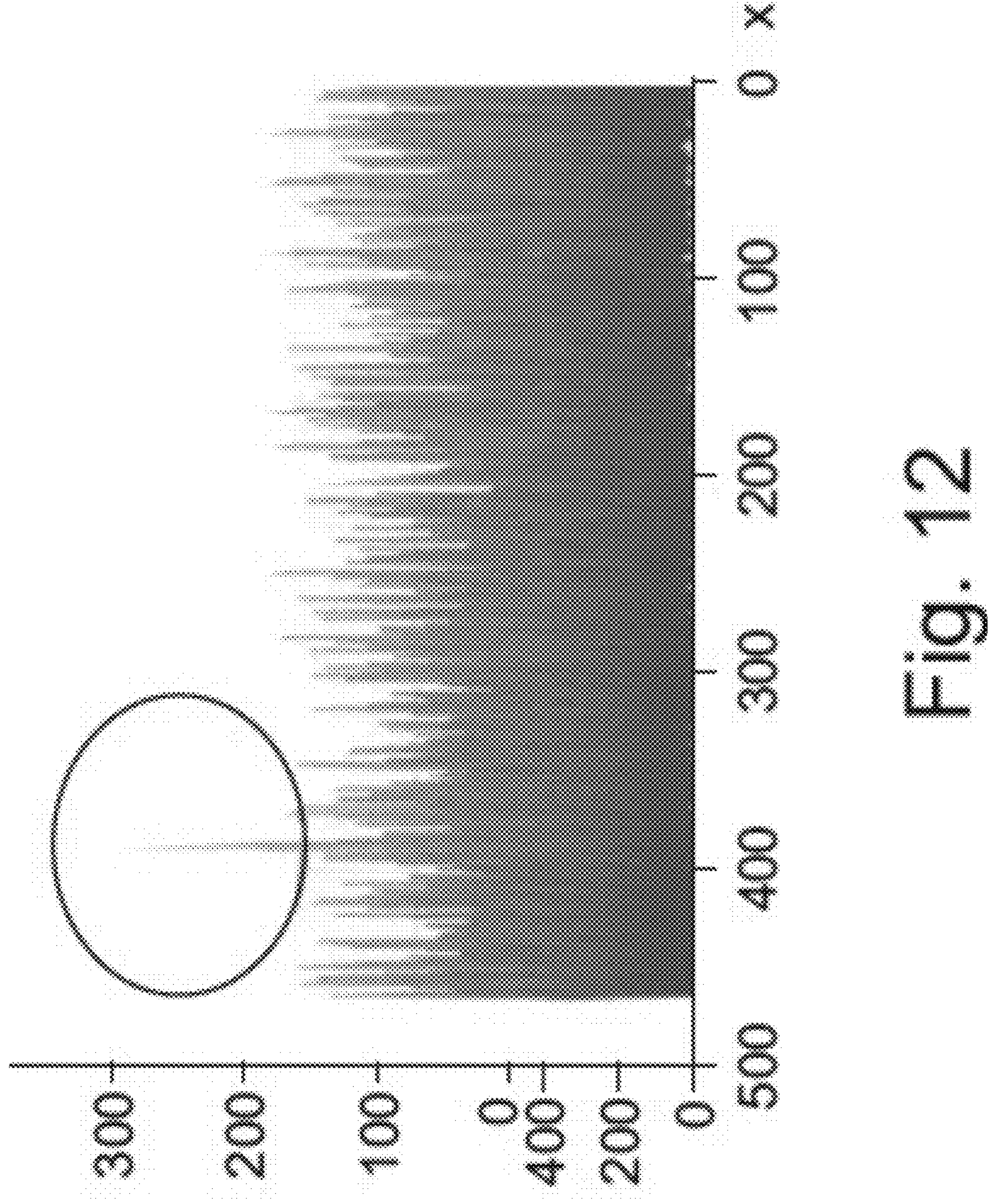
FIG. 12 shows a diagram of the comparison of the height profile of different image strips, according to the teachings of the present disclosure.

FIG. 9 shows an image of a connecting region 13, in which a hole 14 that has been discovered with the method according to the present disclosure may be seen clearly within the connecting region. The hole 14 is located in the upper boundary region of the connecting region 13. The hole 14 is illustrated in the three-dimensional diagrams in FIG. 10 and FIG. 11. The two diagrams are based on the assessment of different positions within an image strip. The lower left axis (y) relates to the number of strips assessed, the lower right axis (x) relates to the length of the image strips (mm) and the vertical axis (z) relates to the height of the surface profile relative to a normalized line (μm). The hole 14 may in this case be seen clearly by the height values in the region close to 200 and is illustrated by drawing a circle. With the three-dimensional representation, it is easy to make a decision that a hole is involved since the amplitude of the hole 14 differs clearly from the rest of the connecting region 13 (FIG. 12). In this case, the x axis shows the number of strips evaluated and the y axis shows the height (μm). The evaluation took 24 seconds, 466 recordings having been assessed. The hole 14 was in this case registered in the $389^{th}$ image strip. This information allows an accurate calculation of the hole position in the connecting region 13 and therefore of the exact position for reprocessing the connecting region 13.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for checking a connection region produced by a laser between at least two metal components, the method comprising:

joining the at least two metal components together by the laser;

providing a photographic recording of the connection region between the at least two metal components that has been formed during the joining of the at least two metal components;

transforming the photographic recording;

creating at least two image strips in the photographic recording, wherein the at least two image strips are arranged vertically with respect to a longitudinal orientation of the connecting region; and assessing the at least two image strips, wherein:

each image strip of the at least two image strips is divided into at least three strip regions, a first strip region of the at least three strip regions is assigned to a first metal component of the at least two metal components, a second strip region of the at least three strip regions is assigned to the connecting region, and a third strip region of the at least three strip regions is assigned to a second metal component of the at least two metal components.

2. The method according to claim 1, wherein the photographic recording is transformed to one or more brightness regions.

3. The method according to claim 1, wherein the photographic recording is transformed to one or more color regions.

4. The method according to claim 1, wherein a shape, a number, and a position of the at least two image strips are freely selected.

5. The method according to claim 1, wherein the at least two image strips are overlapping.

6. The method according to claim 1, wherein:

the photographic recording is transformed to one or more brightness regions, one or more color regions, or a combination thereof, when the photographic recording is transformed to the one or more brightness regions, each brightness region is assigned a brightness value, as a transformed value, and when the photographic recording is transformed to the one or more color regions, each color region is assigned a color value, as the transformed value.

7. The method according to claim 6, wherein:

the transformed values of the first and second strip regions are used to create a baseline in a height diagram of the image strip, and the transformed values includes the color value, the brightness value, or a combination thereof.

8. The method according to claim 7 further comprising creating a height line of the second strip region that is used in relation to the baseline to appraise anomalies during the joining of the at least two metal components.

9. The method according to claim 8 further comprising:

creating a height graph for each image strip; and combining the height graphs of all the image strips to form a three-dimensional surface map.

10. The method according to claim 9, wherein the image strips are interpolated in a sub-pixel range.

11. An apparatus for carrying out the method according to claim 1, the apparatus comprising at least one control device that is configured to control the steps of the method and to register anomalies in the connection region.

12. An apparatus for checking a connection region of at least two metal components, the apparatus comprising:

a laser device configured to join the at least two metal components together to form the connection region of the at least two metal components;

a camera device configured to provide a photographic recording of the connection region being formed by the laser; and a control device in communication with the camera device, the control device comprising one or more processors and a nontransitory computer-readable medium including instructions that are executable by the one or more processors, wherein the instructions include:

transforming the photographic recording;

creating at least two image strips in the photographic recording, wherein the at least two image strips are arranged vertically with respect to a longitudinal orientation of the connecting region; and assessing the at least two image strips, wherein:

each image strip of the at least two image strips is divided into at least three strip regions, a first strip region of the at least three strip regions is assigned to a first metal component of the at least two metal components, a second strip region of the at least three strip regions is assigned to the connecting region, and a third strip region of the at least three strip regions is assigned to a second metal component of the at least two metal components.

13. The apparatus according to claim 12, wherein the instructions further include transforming the photographic recording to one or more brightness regions.

14. The apparatus according to claim 12, wherein the instructions further include transforming the photographic recording to one or more color regions.

15. The apparatus according to claim 12, wherein the instructions further include:

transforming the photographic recording to one or more brightness regions, one or more color regions, or a combination thereof, in response to the photographic recording being transformed to the one or more brightness regions, assigning each brightness region a brightness value, as a transformed value, and in response to the photographic recording being transformed to the one or more color regions, assigning each color region a color value, as the transformed value.

16. The apparatus according to claim 15, wherein the instructions further include dividing each image strip of the at least two image strips into the first strip region, the second strip region, and the third strip region.

17. The apparatus according to claim 16, wherein the instructions further include creating a baseline in a height profile of the image strip based on the transformed values of the first and second strip regions, wherein the transformed values include the color value, the brightness value, or a combination thereof.

18. The apparatus according to claim 17, wherein the instructions further include creating a height profile of the second strip region that is used in relation to the baseline to appraise anomalies during formation of the connection region.

19. The apparatus according to claim 18, wherein the instructions further include:

creating a height graph for each image strip, and combining the height graphs of all the image strips to form a three-dimensional surface map.

* * * * *